United States Patent

Connerney

[15] 3,670,268

[45] June 13, 1972

[54] WAVEGUIDE HYBRID JUNCTION WHEREIN A WALL OF THE E-ARM IS CONTIGUOUS WITH A WALL OF THE H-ARM

[72] Inventor: William R. Connerney, Needham, Mass.

[73] Assignee: Raytheon Company, Lexington, Mass.

[22] Filed: April 15, 1970

[21] Appl. No.: 28,894

[52] U.S. Cl. ....................333/11, 343/854

[51] Int. Cl. ....................H01p 5/12

[58] Field of Search ....................333/11, 98 BE; 343/776–779, 786, 854

[56] References Cited

UNITED STATES PATENTS

| | | | |
|---|---|---|---|
| 2,737,634 | 3/1956 | Lewin et al. | 333/98 BE |
| 2,997,655 | 8/1961 | Petrich | 333/11 UX |
| 3,061,801 | 10/1962 | Gieles | 333/11 X |
| 3,375,472 | 3/1968 | Walker | 333/11 |
| 3,460,144 | 8/1969 | Hannan | 343/777 |

*Primary Examiner*—Paul L. Gensler
*Attorney*—Philip J. McFarland and Joseph D. Pannone

[57] ABSTRACT

A waveguide hybrid junction for microwave energy in which the various arms, i.e., the E-arm, and two sidearms, are fabricated from rectangular waveguides, the E-arm having a 90° bend formed therein in close proximity to the plane of the joint between such arm and the H-arm. A tuning post, located at the 90° bend of the E-arm, is used to compensate for field distortion so that electrical symmetry of the hybrid junction is maintained.

3 Claims, 3 Drawing Figures

INVENTOR
WILLIAM R. CONNERNEY

INVENTOR
WILLIAM R. CONNERNEY

WAVEGUIDE HYBRID JUNCTION WHEREIN A WALL OF THE E-ARM IS CONTIGUOUS WITH A WALL OF THE H-ARM

The invention herein described was made in the course of or under a contract or subcontract thereunder, with the Department of Defense.

BACKGROUND OF THE INVENTION

Waveguide hybrid junctions, commonly referred to as magic tees, have been used in microwave systems for many years. Such junctions are characterized as four-port microwave devices made up of electrically coupled rectangular waveguide sections physically disposed about a plane of symmetry through one of such sections. Thus, a first section, referred to hereinafter as the "H-arm," and two additional sections, referred to hereinafter as the "sidearms," are joined to form an H-plane junction between the H-arm and each sidearm, the three sections being disposed in the shape of a tee. In addition, a fourth section, referred to hereinafter as the "E-arm," is joined to form an E-plane junction between the H-arm and such E-arm, the sidearms and the E-arm also being disposed in the shape of a tee.

A properly designed microwave device constructed as described above is electrically symmetrical and has "magic" properties. That is, power applied to either the H-arm or the E-arm may be divided equally between two identically terminated sidearms, or the vector sum of signals applied to each sidearm may be produced at the H-arm and the vector difference of signals applied to each sidearm may be produced at the E-arm. The latter mode of operation is useful for generation of the sum and difference signals associated with monopulse radar systems.

In a monopulse radar system it is necessary to perform addition and subtraction of R.F. energy received by each quadrant of a planar array antenna. To reduce system noise, signal attenuation, and R.F. coupling, it is desirable to mount the required hybrid junctions on the back plate of the antenna. It is also desirable, especially in missile applications, to minimize the thickness of the antenna assembly. The degree of compactness which can be achieved with known hybrid junctions has been severely limited by the fact that the E-arm extends orthogonal to the antenna plane. It is also desirable to incorporate into the hybrid junction a mechanism with which to balance any discrepancies in insertion looses generated at the antenna and antenna-tee interface. The balancing mechanism used in the prior art has, typically, been a rotating vane resistance card. A limiting feature of this resistance card mechanism is the necessity for appropriately extending the length of the sidearms of the hybrid junction and thereby increasing the size of the antenna package.

It is accordingly an object of the invention to provide an improved hybrid junction which is more compact than hybrid junctions of the prior art.

It is another object of the invention to provide a hybrid junction which is adapted to use in a radar system to minimize the thickness of a planar antenna assembly.

It is another object of the invention to provide a hybrid junction wherein all four arms are essentially co-planar.

It is another object of the invention to provide a hybrid junction wherein an insertion loss balancing mechanism is provided which is simple, compact and easily adjustable.

SUMMARY OF THE INVENTION

These and other objects of the invention are attained generally by constructing the junction such that all three waveguide sections are essentially co-planar, and by inserting an adjustable post into the E-arm at a point in close proximity to the intersection of the E-arm axis with the H-arm axis. When such a post is properly adjusted an electrical symmetry is established within the physically nonsymmetrical hybrid junction, thereby to enable the device to have "magic" characteristics. The amount of penetration of the post into the E-arm waveguide is made adjustable through use of a conventional threaded screw mechanism, thereby providing an insertion loss control means for the hybrid junction.

BRIEF DESCRIPTION OF THE DRAWINGS

Other objects and advantages of this invention will become apparent from the following specification taken in connection with the accompanying drawings wherein.

DESCRIPTION OF THE PREFERRED EMBODIMENT

Figure 1:
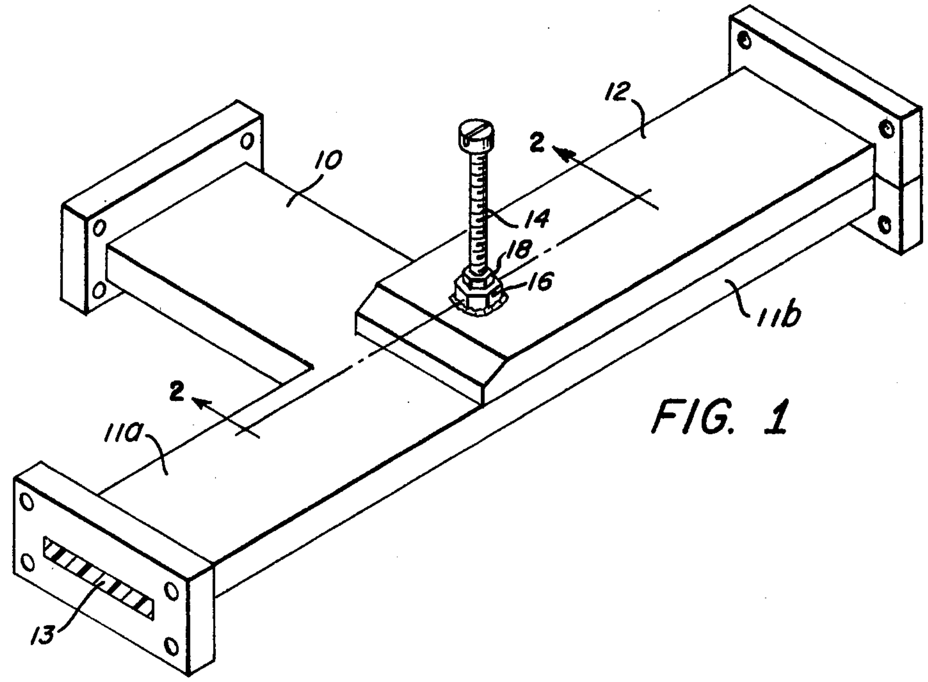
FIG. 1 shows a perspective view of a waveguide hybrid junction constructed in accordance with the principles of the invention.

Referring now to FIG. 1, the invention is shown to include rectangular waveguide sections 10, 11*a*, 11*b*, 12, each here fabricated from electrically conductive material such as copper. The outer end of each one of the rectangular waveguide sections 10, 11*a*, 11*b*, 12 is terminated in a flange (not numbered) of conventional construction. In the illustrated example the rectangular waveguide sections 10, 11*a*, 11*b* and the corresponding flanges are formed together by plating the selected electrically conductive material on an appropriately shaped core 13 of a dielectric, as polystyrene foam. Rectangular waveguide section 12 and the attached flange (not numbered) are similarly formed by plating an appropriately shaped core of a selected dielectric material with an electrically conductive material as shown. The rectangular waveguide section 12 may be coupled to the rectangular waveguide section 10 in any convenient manner, as by silver epoxy bonding. Rectangular waveguide section 10 is hereinafter sometimes referred to as the H-arm; rectangular waveguide sections 11*a*, 11*b* are referred to sometimes as the sidearms; and rectangular waveguide section 12 as the E-arm. It should be noted here in passing that any conventional bend may be formed as desired in any one of the rectangular waveguide sections 10, 11*a*, 11*b*, 12 to permit connection of the illustrated junction to elements (not shown) in a radio frequency circuit. It should also be noted that the junction between each one of the sidearms 11*a*, 11*b* and the H-arm 10 is a so-called H-plane junction and the junction between the E-arm 12 and the H-arm 10 is a so-called E-plane junction.

A tuning post 14 is mounted on the E-arm 12 in any convenient manner so that its lower end (not numbered) may be moved into the field at the junction between the H-arm 10 and the E-arm 12. In the illustrated example, such mounting is accomplished by affixing a nut 16, as by silver epoxy bonding, to the wall of the E-arm 12 and providing a lock nut 18.

Figure 2:
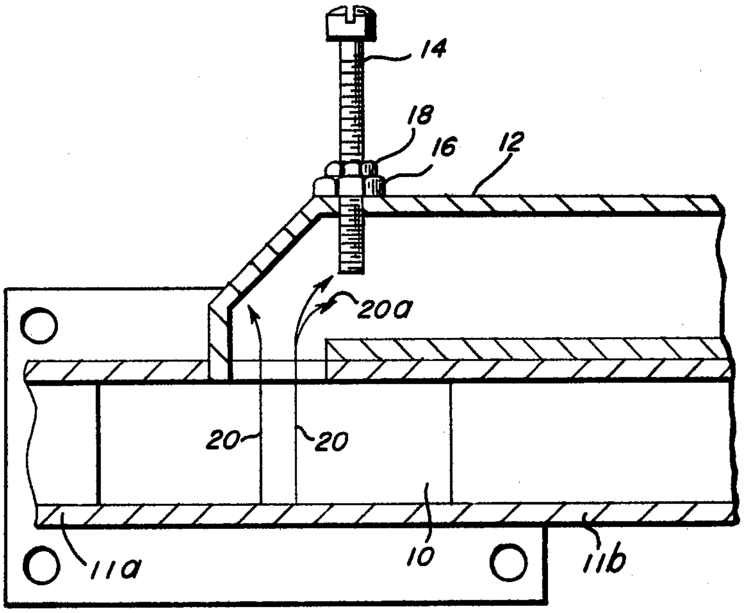
FIG. 2 shows a partial section view, somewhat simplified, of the structure of FIG. 1 taken along a plane passed centrally through the E-arm thereof to illustrate the way in which the invention operates.

Referring now to FIG. 2 wherein elements identical to elements shown in FIG. 1 are numbered similarly, the electric field at the E-plane junction is shown schematically. The shape of such field, when the tuning post 14 is in the illustrated position, is indicated by the arrows 20. Broken arrow 20*a* along with the arrow 20 on the left indicates the shape of the electric field when the tuning post 14 is removed. It will be observed that the adjustment of the tuning post 14 is effective to vary the symmetry of the electric field and that there is a particular position for such post at which the symmetry of the electric field in the illustrated case is substantially the same at the E-plane junction as the symmetry which would exist if the E-arm 12 were orthogonal to the H-arm 10.

When the tuning post 14 is adjusted so that symmetry of the electric field at the E-plane junction is established, experimental results verify that the junction has the characteristics of known magic tees. That is, there is a high degree of isolation between the E-arm and the H-arm; the power in any signal introduced into either the E-arm or the H-arm is divided almost equally between the sidearms; and the junction has little effect on the standing wave ratio of any signal passing through it.

The disclosed junction may, if desired, also be used to control the insertion loss suffered by microwave signals. Thus, if the tuning post 14 is adjusted so that the symmetry of the electric field at the E-plane junction is disturbed and signals are applied to each one of the sidearms, the insertion loss between each sidearm and the E-arm and/or the H-arm changes. It has been determined experimentally that an attenuation range of approximately 1 db may be so obtained, again without significant effect on phase or standing wave ratio of the applied signals.

Figure 3:
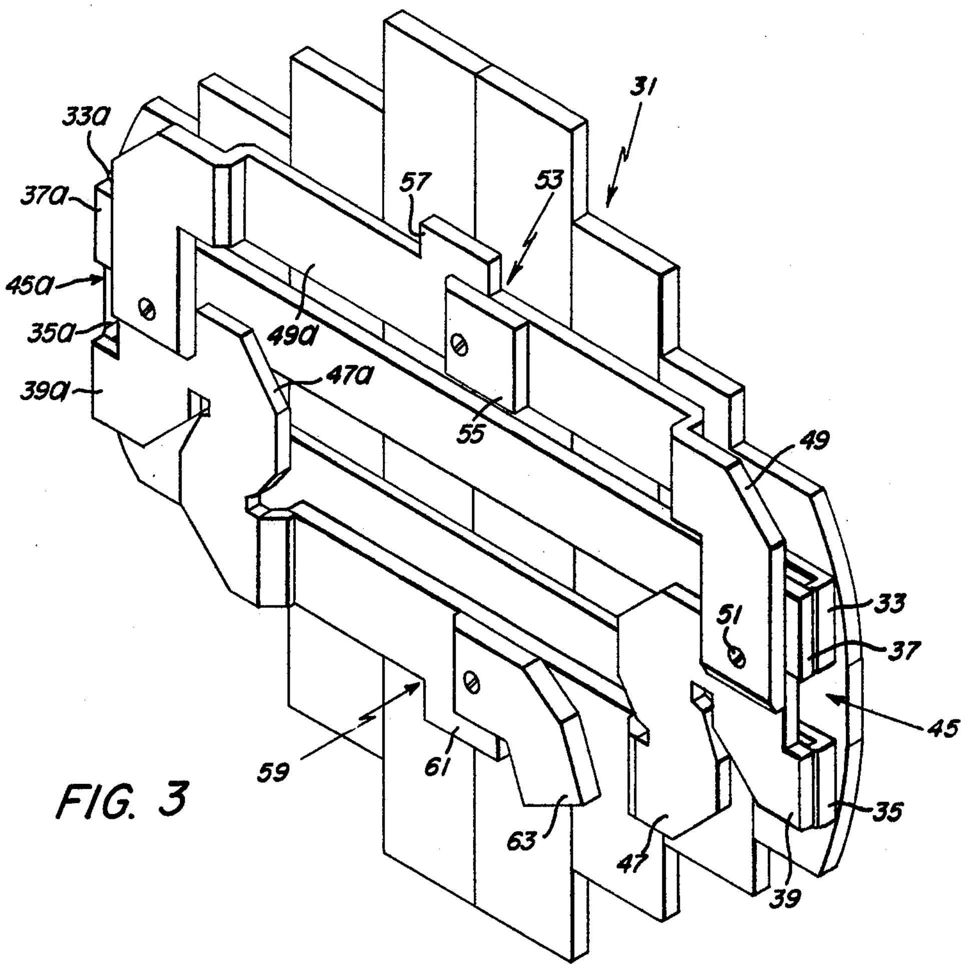
FIG. 3 shows four contemplated junctions for deriving monopulse sum and difference signals.

Before referring to FIG. 3, it should be recognized that that figure, for clarity of illustration and explanation, shows only those elements essential to an understanding of how here contemplated junctions may be used in a monopulse receiving antenna assembly. Accordingly, conventional elements which a person of ordinary skill would include in a complete assembly have been illustrated in outline or have been omitted from the figure. For example, the shape and arrangement of the individual receiving elements of the planar array shown in the figure and the manner in which energy is coupled between such elements and the waveguide couplers are not shown; the mechanical retaining means for making a unitary structure out of the illustrated elements have been omitted; and the first detectors for the various radio frequency signals are not included in the figure.

Referring now to FIG. 3 it may be seen that four hybrid junctions 45, **45*a*, 53, 59, each fabricated according to this invention, may be adapted to use with a planar array to derive, at radio frequencies, monopulse sum and difference signals. Thus, in FIG. 3 a four-quadrant planar array 31 for monopulse reception of signals from a source (not shown) is connected through couplers 33, 33*a*, 35, 35*a* to the sidearms 37, 37*a*, 39, 39*a* of hybrid junctions 45, 45*a*. Each one of the couplers 33, 33*a*, 35, 35*a* is matched to its appropriate sidearm 37, 39, 37*a*, 39*a* of one of the two hybrid junctions 45, 45*a*, thereby connecting a single quadrant of the four-quadrant planar array 31 to a separate one of the sidearms 33, 33*a*, 35, 35*a*. Junction 45 includes an H-arm 47 and an E-arm 49, as described hereinbefore in connection with FIGS. 1 and 2. Tuning post 51, similar to the tuning post 14 shown in FIGS. 1 and 2, completes the hybrid junction 45. The signal in the H-arm 47 is the sum signal of the signals applied to the sidearms 37, 39, while the signal in the E-arm 49 is the difference of such signals. Hybrid junction 45*a* is similar to hybrid junction 45. Thus, the signal in the H-arm 47*a* is the sum of the signals applied to the sidearms 37*a*, 39*a* and the signal in the E-arm 49*a* is the difference of such signals. E-arms 49, 49*a* in turn serve as the sidearms of a hybrid junction 53. The E-arm 55 of this junction is terminated in a conventional matched load (not shown). The signal in the H-arm 57, (which is the sum of the signals in the sidearms 49, 49*a*) is connected in any convenient way to the first detector (not shown) of the receiver with which the illustrated antenna is used. The H-arms 47, 47*a* of the hybrid junctions 45, 45*a* serve as the sidearms of hybrid junction 59. The H-arm 61 and the E-arm 63 of the hybrid junction 59** are connected in any convenient manner to the first detector (not shown) of the receiver with which the illustrated antenna is used.

A moment's thought will make it clear that the signals in the H-arm 61 of hybrid junction 59 are the sum of the signals applied to hybrid junctions 45, **45*a*, i.e., the monopulse sum signal of four-quadrant planar array 31. Likewise, the signals in the E-arm 63 of hybrid junction 59 are the monopulse elevation difference signal and the signals in H-arm 57 of hybrid junction 53 are the monopulse azimuth difference signal of the four quadrant planar array 31**. The terms azimuth or elevation in the above are interchangeable, depending on the sense of polarization of the antenna and/or the radiating element design on the antenna front face.

While the described embodiments of the invention are useful to an understanding thereof, it will be immediately apparent to those having ordinary skill in the art that other embodiments are also covered by the inventive concepts disclosed herein. For example, it is contemplated that conventional rectangular waveguides could be used to form the hybrid junction rather than guides using polystyrene foam as a dielectric. Further, any structure which may be adjusted to affect the symmetry of the field at the E-plane junction without hindering power flow through the E-arm may be used in place of the tuning post. It is felt, therefore, that the invention should not be restricted to its disclosed embodiments but rather should be limited only by the spirit and scope of the following claims.

What is claimed is:

1. A hybrid junction, including an H-arm, an E-arm and two sidearms, each one of such arms being fabricated from a section of rectangular waveguide to form a unitary structure for directing the flow of microwave energy in waveguides, such junction comprising:

a. an H-plane junction between one end of each one of the two sidearms and a narrow wall of the H-arm adjacent to an end thereof, the H-arm and the two sidearms thereby forming a tee;

b. an E-plane junction between one end of the E-arm and a wide wall of the H-arm, such junction being intermediate of the H-plane junctions, the E-arm being bent to bring one wall thereof into a plane substantially contiguous with a plane defined by one wide wall of the H-arm; and c. a tuning post mounted on the E-arm and projecting inwardly thereof for adjusting the symmetry of the field at the E-plane junction.

2. A hybrid junction as claimed in claim 1 wherein the E-arm junction is formed such that the field of the microwave energy flowing through such junction is, absent the tuning post, nonsymmetrical.

3. In a microwave antenna array for producing monopulse sum signals by adding signals received by the individual receiving elements of such array and for producing monopulse difference signals by subtracting signals received by the individual receiving elements in one portion of such array from signals received by the individual receiving elements in another portion of such array, microwave sum and difference circuitry comprising:

a. a first, second, third, and fourth hybrid junction, each such junction having two sidearms, an H-arm and an E-arm, each one of the latter being bent to lie in a plane substantially coplanar to the plane of its corresponding H-arm;

b. a tuning post entering each E-arm at the junction thereof with its corresponding H-arm;

c. means for connecting the receiving elements in one of the quadrants of the microwave antenna array to a first sidearm of the first hybrid junction, the receiving elements in a second one of such quadrants to a second sidearm of the first hybrid junction, the receiving elements in a third one of such quadrants to a first sidearm of the second hybrid junction and the receiving elements in a fourth one of such quadrants to a second sidearm of the second hybrid junction;

d. means for connecting the H-arm of the first hybrid junction and the H-arm of the second hybrid junction to different ones of the sidearms of the third hybrid junction; and, e. means for connecting the E-arm of the first hybrid junction and the E-arm of the second hybrid junction to different ones of the sidearms of the fourth hybrid junction.

* * * * *